March 13, 1951  F. A. STRAUB  2,544,811
CLUTCH LEVER BOOSTER
Filed Feb. 27, 1948

INVENTOR.
FREDERICK A. STRAUB,
BY
ATTORNEY.

Patented Mar. 13, 1951

2,544,811

UNITED STATES PATENT OFFICE 2,544,811

CLUTCH LEVER BOOSTER

Frederick A. Straub, Los Angeles, Calif., assignor to F. A. Straub Equipment Co., Los Angeles, Calif., a corporation of California Application February 27, 1948, Serial No. 11,622

9 Claims. (Cl. 74—97)

This invention relates to an attachment for use with clutch-actuating levers and, more particularly but not necessarily, to a booster attachment for clutch-actuating levers, whereby the clutch may be readily engaged and disengaged without expenditure of excessive energy.

Practically all clutches employed for connecting and disconnecting the power plant of a vehicle with its wheels or track are of the spring-biased type, that is, the clutch includes a spring for biasing the clutch plate into engagement with the clutch disc. Clutches employed for guiding the treads of tractors (and those used in connection with heavy vehicles, such as busses and trucks) require the clutch spring to possess considerable strength. Clutch mechanisms of Diesel and gasoline motor-driven tractors, bulldozers, and other heavy equipment, particularly those wherein each track may be selectively driven, are operated by means of hand levers. The normal position is one in which the clutch is engaged and the clutch is supposed to be held in such position by spring means which are a part of the clutch. In actual practice, however, the operator pulls the clutch-operating lever to disengage the clutch, and when it is desired to re-engage the clutch, the operator releases the lever, whereupon the internal clutch springs cause the clutch to engage but do not move the associated clutch mechanism and the clutch lever to the absolute limit of movement or travel, and, instead, permits the clutch to ride against the usual throwout bearing. Operation of a tractor clutch while riding against the throw-out bearing, for a period of two or three hours, will very often burn out such bearing and necessitate extensive, expensive, and time-consuming repairs.

It will also be noted that during the operation described, the operator must manually move the lever to disengage the clutch and in so doing he has to overcome the force of the internal clutch springs. Furthermore, the operator must hold the clutch lever in such disengaged position until the clutch is to be re-engaged.

The present invention is directed to an attachment whereby the effort expended in actuating the clutch levers is reduced to a minimum, the lever is positively returned to engaged position to prevent the clutch from riding upon the throw-out bearing, and, if desired, the attachment may be adjusted so that the lever will stay in clutch-disengaged position (upon being moved thereinto), thereby permitting the operator to use his hands in actuating other controls when the clutch is disengaged. A tractor or other equipment can be operated with much greater efficiency and with a lower expenditure of energy.

Generally stated, the present invention contemplates an attachment or booster which can be easily attached to the clutch lever and to the vehicle, means being provided whereby springs compensate and counterbalance the force of the integral clutch springs in disengaged position and also assist the clutch springs in engaged position. The springs carried by the device of this invention act as a toggle which facilitates the movement of the clutch lever and simultaneously prevent the clutch from riding the usual throwout bearing. Means are provided for regulating the force of the springs and other means insure alignment of the spring thrust with the plane of movement of the clutch lever so that the working parts cannot jam or stick in any of the intermediate or extreme working positions.

Accordingly, it is a primary object of this invention to provide a spring-actuated booster for aiding and assisting an operator during the actuation of such levers.

Another object is to provide a booster for clutch levers that may be readily adapted for use with the conventional clutch lever.

A further object is to provide a device which facilitates the movement of a clutch lever into clutch-disengaged position, but insures the complete return of the lever into clutch-engaged position.

Another object is to provide a booster for clutch levers having the above characteristics that will consist of a minimum number of parts, that may be easily and readily installed, efficient in operation, durable and comparatively cheap to manufacture.

The above and other objects will be made apparent throughout the further description of the invention when taken in connection with the accompanying drawings, wherein like reference characters refer to like parts. It is to be distinctly understood that the drawings are not a definition of the invention, but merely illustrate exemplary forms by means of which the invention may be effectuated. In such drawings Fig. 1 is a side elevation of one form of clutch lever booster.

Figure 1:
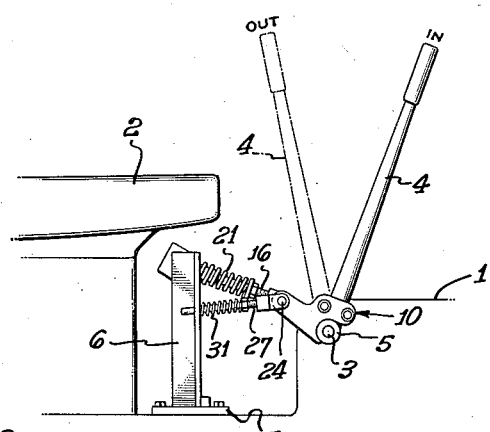
Figure 2:
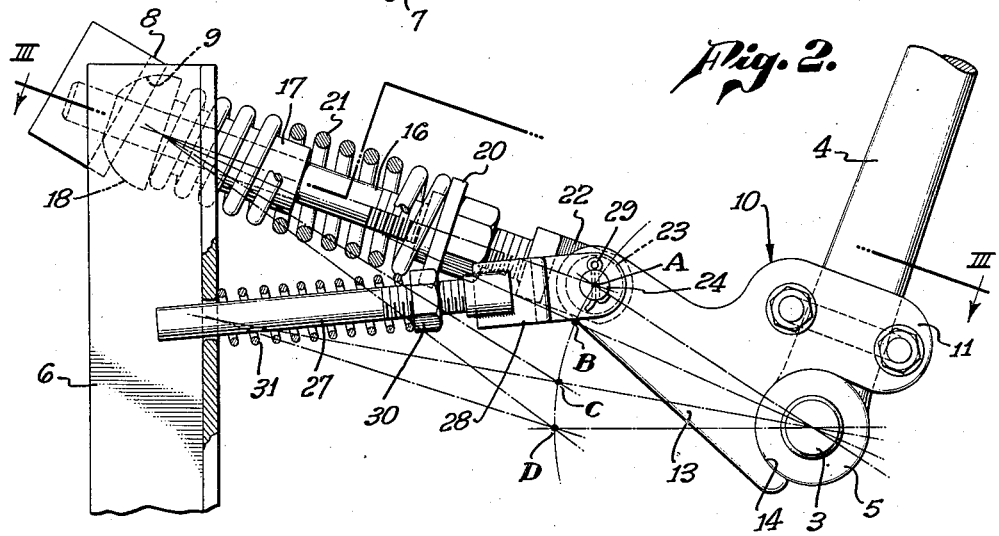
Fig. 2 is an enlarged side elevation, partly in section, showing various positions assumed by the parts.
Figure 3:
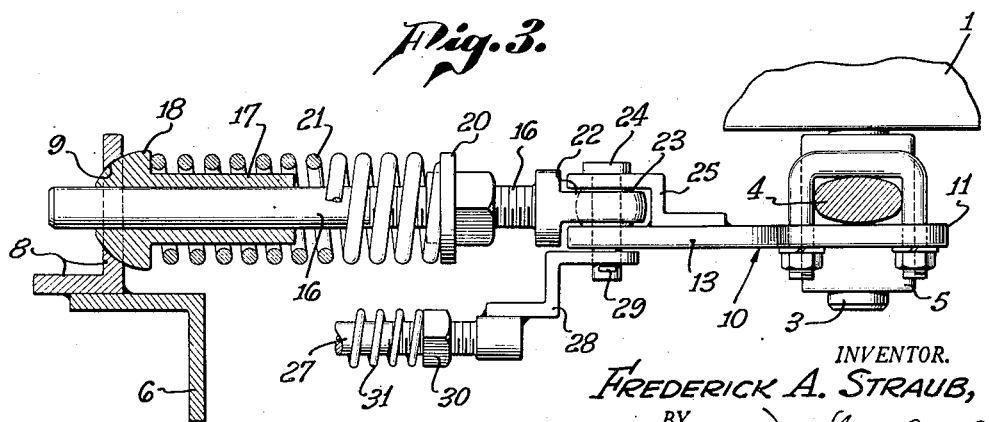
Fig. 3 is a plan view partly in section taken along plane III—III of Fig. 2.

For illustrative purposes, Fig. 1 shows the device as applied to a tractor wherein the gear casing and clutch housing are indicated at 1, the operator's seat at 2, and the clutch rock shaft at 3. Attached to the clutch rock shaft is the operating lever 4 provided with a hub 5. When the lever 4 is in its forward position (shown in full lines), the clutch is in engaged position. The operator pulls the lever toward him (to the left) in order to disengage the clutch. The rock shaft, as well as lever 4, is normally biased into engaged position by the normal, integral clutch springs which are a part of the clutch mechanism.

The present device comprises the fixed, upstanding support 6 horizontally spaced from the axis of the rock shaft 3, the support 6 being attached to a fixed member such as a floor, by means of the base 7 and suitable machine screws, bolts, or the like. The upper end of the support 6 may be provided with an inclined plate or member 8 carrying a concave, apertured seat indicated at 9, such seat being directed toward the axis of the rock shaft 3. The fixed support is arranged so as to position the concave seat above the rock shaft and a toggle connection is provided between the lever 4 and such seat.

Removably attached to the lever 4 is a clutch lever bracket, generally indicated at 10, and preferably comprising oppositely directed, substantially parallel arms, namely the clamp arm 11, arranged to extend transversely of the lever 4 and provided with apertures through which a U-shaped clamp may extend so as to graspingly hold the lever 4 against the clamp arm 11. The other or actuating arm of the bracket is indicated at 13 and the axis of such arm preferably intersects the axis of the rock shaft. A shoulder, preferably of concave contour, indicated at 14, is arranged to abut the hub of the lever 4.

The outer or movable end of the actuating arm 13 is pivotally connected to a guide rod 16, the outer end of the guide rod being slidably received in a sleeve 17 provided with a hemispherical or rounded head 18 movably seated on the concave seat 9. An adjustable stop 20 is carried by the rod 16, such stop forming a shoulder for a spring 21 extending between the head 18 of the guide sleeve and the stop 20.

The stop 20 may be adjustable along the guide rods by reason of a threaded engagement with the rod.

The inner end of the guide rod 16 may be provided with a T-shaped head including a tongue 22 ported so as to encircle a bearing member 23 provided with a substantially spherical surface. The bearing member 23 may be carried upon a pin 24 extending through the ported end of actuating arm 13. In order to firmly support the pin, the arm 13 may be provided with a bracket 25 welded or otherwise attached to the arm.

A compensating rod (which may be provided with a clevis or off-set end portion) is indicated at 27, the outer end of such rod extending through a suitable port in the support or opening 6, whereas the angled end or clevis is indicated at 28. This clevis is ported so as to receive pin 24 and such pin may be firmly held in position in any suitable manner, such as, for example, by means of a cotter key 29. The compensating rod 27 may also be provided with a threaded portion carrying an adjustable stop 30 and a spring 31 extends between such stop and the fixed support 6.

The fixed support 6 is so arranged with respect to the axis of the rock shaft 3 that the pivotal connection between the guide rods and the bracket 10 is to one side of a straight line between the axis of the rock shaft and the seat when the clutch lever is in engaged position and to the other side of said line when the clutch lever is in disengaged position. Moreover, the relationship between the concave seat and the axis of the rock shaft 3 is such that when the clutch is in fully engaged position, the pivot point or pin 24 is but slightly above the straight line between the concave seat and the rock shaft, as indicated by point A. When the clutch is in disengaged position, the pivotal connection between the clutch lever bracket 10 and the guide rods is at a materially greater distance from such straight line between the center of the concave seat 9 and the rock shaft 3, as indicated by the point D. When the pivot point or pin 24 is in alignment with the axis of the rock shaft 3 and the center of the concave seat 9, the clutch is in an engaged position, but such clutch is actually riding on the throw-out bearing of the clutch.

It will now be understood that by properly adjusting the stops 20 and 30, the clutch lever will be thrown into completely engaged position and is normally held there by the conjoint action of the springs 21 and 31. As soon as the operator moves the clutch lever 4 toward him, so as to cause the pivot point or pin 24 to traverse the straight line joining the axis of the rock shaft and the concave seat 9, the spring 21 will exert its force to overcome the internal clutch springs so that very little effort is required on the part of the operator to move the clutch lever into clutch-disengaged position. The tension of the springs 21 and 31 may be so adjusted that the clutch lever will actually hold the clutch in clutch-disengaged position when the lever 4 and the bracket 10 place the pivotal connection at point D. It will be noted that point D is beyond a straight line joining the axial center of rock shaft 3 and the pivotal point of connection between compensating guide rod 27 and the support 6, so that at position D spring 31 has a tendency to maintain the clutch lever in clutch-disengaged position.

By reason of the relationship described hereinabove, very little effort is required on the part of the operator to readily move the lever from one position to another. The possibility of permitting the clutch to ride on the throw-out bearing is obviated, since the spring 31 will prevent spring 21 from remaining on the dead center position B and instead will throw the lever into position A, wherein the clutch is completely engaged and does not exert thrust against the throw-out bearing.

All changes and modifications coming within the scope of the appended claims are embraced thereby.

I claim:

1. In a device for facilitating the shifting of a clutch lever carried by a rock shaft, and maintaining said lever in clutch-in and clutch-out positions, the provision of: a bracket having an intermediate portion arranged to adjoin a rock shaft and a pair of substantially parallel, oppositely directed arms; means for connecting one of said arms to the lever in a position transverse thereto with the longitudinal axis of the other arm, when extended, intersecting said rock shaft; a fixed support spaced from the rock shaft and including a concave, apertured seat; a guide sleeve provided with a hemispherical head on said seat; a guide rod having one end pivotally connected to the end of the bracket arm and the other end slidably received in the sleeve; a compression spring carried by the guide rod with one end thereof bearing against the head of said sleeve; and an adjustably positionable stop on said guide rod for the other end of said spring, the fixed support being arranged to position the concave apertured seat whereby the pivotal connection between the guide rod and bracket arm is normally not in alignment with said seat and rock shaft axis.

2. A device of the character stated in claim 1, wherein the pivotal connection between the guide rod and arm includes means for permitting limited lateral motion.

3. In a device of the character stated in claim 1, the provision of a second guide rod pivotally connected by one end to the arm of the bracket, a sliding connection between the other end of the second guide rod and the fixed support at a point vertically displaced with respect to the concave seat, and a compression spring on said second guide rod bearing against said support.

4. In combination with a clutch rock shaft, an actuating lever for oscillating said rock shaft, spring means for aiding said oscillation, said spring means including a support spaced from said rock shaft, an arm rigidly connected to said lever, a guide rod pivotally connected to said arm and slidably supported in said support, said pivotal connection including universal means, a second guide rod pivotally connected to said arm and having its longitudinal axis disposed at an angle to the first said guide rod, and spring means carried by the last said guide rod and interposed between said support and said pivot connection.

5. The combination with a clutch rock shaft, an actuating lever therefor, a support spaced from said rock shaft, a pair of springs interposed between the said support and said rock shaft, the said springs being disposed at an angle one to the other and having a common pivot point relative to said rock shaft.

6. The combination with a clutch rock shaft, a lever having a hub rigidly fixed to said rock shaft, spring means for aiding in the oscillation of said rock shaft, said spring means including a support spaced from said rock shaft, a bracket having a curved portion for partially surrounding the said hub, the said curved portion terminating in an arm for engagement with the adjacent portion of said lever, clamp means for rigidly clamping the said arm on said lever, the said bracket having an extension, and a pair of spring means pivotally connected to said extension at a common point, the said spring means including guide rods extending at an angle one to the other and having their free ends slidably connected with said support.

7. The combination in accordance with claim 6, wherein the said slidable connecting means includes means for providing limited universal movement to one of said guide rods relative to said support.

8. In a clutch lever booster assembly for use with a clutch lever mounted on a clutch rock shaft: a clutch lever bracket arranged to be removably connected to a clutch lever, said bracket including a clamping arm transverse to the clutch lever and an actuating arm having a longitudinal axis whose extension would pass through the rock shaft; a fixed support provided with a universal seat in its upper end; a guide sleeve seated in said seat; a rod having one end slidable in the guide sleeve and the other end pivotally connected to the end of the actuating arm; an adjustable stop on said rod; and spring means between said stop and sleeve, said universal seat being positioned to place the pivotal connection between said rod and arm to one side of a straight line joining said seat and rock shaft axis when the clutch lever is in clutch-engaged position and to place said pivotal connection on the other side of such straight line and at a greater distance therefrom when the clutch lever is in clutch-disengaged position.

9. In a clutch lever booster assembly of the character stated in claim 8, the provision of a compensating spring assembly operably connected to the actuating arm and fixed support.

FREDERICK A. STRAUB.

REFERENCES CITED

The following references are of record in the file of this patent:

UNITED STATES PATENTS

| Number | Name | Date |
|---|---|---|
| 1,393,111 | Getchell | Oct. 11, 1921 |
| 1,444,556 | Sachs | Feb. 6, 1923 |
| 1,670,472 | Millward | May 22, 1928 |
| 1,835,982 | Hammerly | Dec. 8, 1931 |
| 2,329,898 | Henning | Sept. 21, 1943 |
| 2,402,932 | Van Buskirk | June 25, 1946 |
| 2,457,497 | Rowe | Dec. 28, 1948 |
| 2,458,342 | Carbuhn | Jan. 4, 1949 |